US009628682B2

(12) United States Patent
Pollock et al.

(10) Patent No.: US 9,628,682 B2
(45) Date of Patent: Apr. 18, 2017

(54) HIGH-RESOLUTION HYPER-SPECTRAL ORTHOGRAPHIC IMAGING SPECTROMETER

(75) Inventors: David B. Pollock, Guntersville, AL (US); Patrick J. Reardon, Madison, AL (US)

(73) Assignee: Board of Trustees of the University of Alabama, fo, Huntsville, AL (US)

( * ) Notice: Subject to any disclaimer, the term of this patent is extended or adjusted under 35 U.S.C. 154(b) by 585 days.

(21) Appl. No.: 13/548,801

(22) Filed: Jul. 13, 2012

(65) Prior Publication Data

US 2014/0300806 A1    Oct. 9, 2014

(51) Int. Cl.
| H04N 5/225 | (2006.01) |
| G01J 3/28 | (2006.01) |
| G01J 3/433 | (2006.01) |
| G01J 3/447 | (2006.01) |
| G01J 3/02 | (2006.01) |
| G02B 26/08 | (2006.01) |
| G02B 27/00 | (2006.01) |
| H04N 5/232 | (2006.01) |
| H04N 5/349 | (2011.01) |

(52) U.S. Cl.
CPC .......... *H04N 5/2254* (2013.01); *G01J 3/0208* (2013.01); *G01J 3/0262* (2013.01); *G01J 3/2803* (2013.01); *G01J 3/2823* (2013.01); *G01J 3/433* (2013.01); *G01J 3/447* (2013.01); *G02B 26/0891* (2013.01); *G02B 27/0018* (2013.01); *H04N 5/23229* (2013.01); *H04N 5/349* (2013.01)

(58) Field of Classification Search
CPC .......... G01J 3/02; G01J 3/0262; G01J 3/2823; G02B 26/0891; G02B 27/0018
See application file for complete search history.

(56) References Cited

U.S. PATENT DOCUMENTS

| 4,099,875 | A | * | 7/1978 | McMahon | G01S 17/95 250/574 |
| 4,188,533 | A | * | 2/1980 | Ashenfelter | G01N 21/27 250/338.1 |
| 4,542,963 | A | | 9/1985 | Linlor | |
| 4,603,251 | A | * | 7/1986 | Hristozov | G01N 21/474 250/226 |
| 5,121,251 | A | * | 6/1992 | Edwards | G02B 21/00 359/368 |
| 5,371,369 | A | * | 12/1994 | Kent | 250/352 |
| 5,756,981 | A | * | 5/1998 | Roustaei | G03F 7/705 235/462.07 |
| 5,833,596 | A | * | 11/1998 | Bonnell | A61B 1/042 250/353 |

(Continued)

*Primary Examiner* — Kara E Geisel
*Assistant Examiner* — Dominic J Bologna
(74) *Attorney, Agent, or Firm* — Maynard Cooper & Gale, P.C.; Jon Holland

(57) ABSTRACT

A camera concurrently produces an orthographic map and map spectral content. Illumination from an image passes through a phase modulator and the resulting rotating photoflux phase is converted to an electrical signal by multiple adjacent sensors of detectors of array of detectors. The amount of unwanted illumination reaching the sensors is reduced by a set of baffles that shield and protect the transducers from unwanted out-of-field light and other light sources.

21 Claims, 7 Drawing Sheets

(56) References Cited

U.S. PATENT DOCUMENTS

| | | | | |
|---|---|---|---|---|
| 6,024,458 A | * | 2/2000 | Lundgren | G02B 7/00 |
| | | | | 359/399 |
| 6,072,634 A | * | 6/2000 | Broome et al. | 359/637 |
| 6,466,961 B1 | * | 10/2002 | Miller | 708/816 |
| 2001/0052979 A1 | * | 12/2001 | Treado | G01B 11/2545 |
| | | | | 356/326 |
| 2004/0141660 A1 | * | 7/2004 | Barth et al. | 382/284 |
| 2007/0081200 A1 | * | 4/2007 | Zomet et al. | 358/484 |
| 2007/0188653 A1 | | 8/2007 | Pollock et al. | |
| 2009/0152453 A1 | * | 6/2009 | Li et al. | 250/235 |
| 2010/0328659 A1 | * | 12/2010 | Bodkin | G01J 3/02 |
| | | | | 356/326 |

* cited by examiner

HIGH-RESOLUTION HYPER-SPECTRAL ORTHOGRAPHIC IMAGING SPECTROMETER

STATEMENT REGARDING FEDERALLY SPONSORED RESEARCH OR DEVELOPMENT

This invention was made with Government support from DOI-NBC of Ft. Huachuca, Ariz. Support was provided under Contract No. NBCHCD50090 awarded by the U.S. Department of the Interior—National Business Center on behalf of a Department of Defense Agency—Defense Advanced Research Projects Agency. The Government has certain rights in the invention.

RELATED ART

The disclosure relates to improvements of a ground, exo-atmospheric, or aerial based image capture system comprising a plurality of cameras positioned in a camera mount to capture images. The captured images are stitched together to form a collective image of a scene or an object. In particular, the disclosure expands on previous work described in U.S Patent Publication 2007/0188653 published on Aug. 16, 2007 which is incorporated herein by reference. Improved cameras replace the plurality of cameras of the image capture system providing an improved image capture system. The improved image capture system simultaneously provides a projected area scene and a scene spectrum with an improved binary dynamic range greater than 1000 to 1.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

An image capture system comprises one or more cameras mounted to a camera mount, such as described in U.S Patent Publication 2007/0188653 published on Aug. 16, 2007, which is incorporated herein by reference. Such an image capture system may be used to observe various items, such as people, terrain and associated items from commercial facilities, a moving platform, a vehicle, an aircraft or a satellite. The characteristic of each camera of the one or more cameras is a factor in determining the characteristics, such as size and quality, of a collective image of the image capture system. It would be understood by those persons skilled in image capturing technology that the quality of optical information of the collective image is partially dependent on the quality of the image from each camera of the image capture system. Embodiments of an improved camera of the present disclosure provide both quality spatial information and spectral information, thereby improving the quality of the collective image. In general, digital cameras are used as elements of such image capture systems. Such digital cameras focus light energy from radiant sources of a viewed object or scene on a detection panel having an array of detectors. The detection panel converts, via its detectors, the light energy into electrical signals that are communicated to a processing element. The processing element converts the electrical signals into image information that may be viewed on a display device, such as a digital monitor. Viewable images from multiple cameras may be combined, e.g., stitched together, to form a composite image of the object or scene provided by cameras of the image capture system.

An embodiment of a camera of the present disclosure comprises a lens, a spatial-phase modulator, a baffle system and a detection panel having detectors with multiple sensors. Light energy from radiant sources enters the camera via an aperture in a frame of the camera and the spatial-phase modulator modulates the light energy so that the dynamic range of the camera is extended. Modulated light energy from the modulator is received by a lens, wherein the lens focuses the modulated light energy on a detection panel having an array of detectors and whose detection surface is aligned with the focal plane of the lens. The detectors have multiple sensors that convert the modulated light into electrical signals that are communicated to a processing element. The processer processes the electrical signals to provide image information in response to the energy from the radiant sources. The baffle system comprises multiple baffles positioned to reduce the amount of unwanted light energy that is received by detectors of the detection panel.

Figure 1:
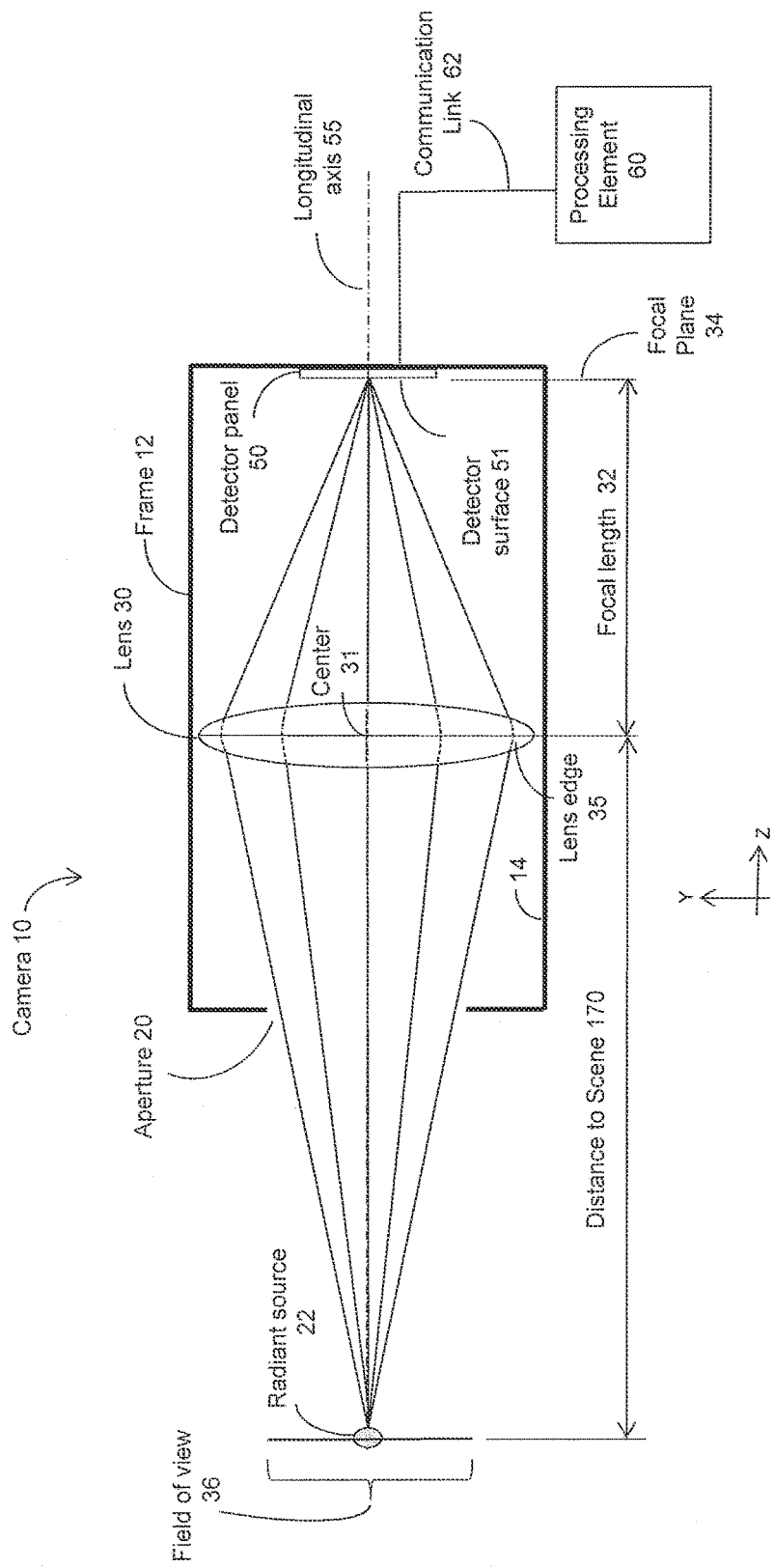
FIG. 1 depicts a conventional camera having a lens and a detector panel.

FIG. 1 depicts a conventional camera 10 having a lens 30 that focuses light energy from a radiant source 22 on a detection panel 50. Although only one radiant source 22 is depicted, it would be understood by those skilled in the area of optics, that a scene in a field of view 36 of camera 10 at a distance 170 from the lens 30 has multiple radiant sources 22 at multiple distances 170 that represent the scene. Detectors on a detection surface 51 of detection panel 50 convert the focused light energy into electrical signals and such signals are communicated to processing element 60 via communication link 62. Processing element 60 converts the electrical signals into optical information that may be viewed on a display device, such as, for example, a digital monitor. Components of the camera 10, such as lens 30 and detector panel 50, are mounted within a frame 12 of the camera 10. The frame 12 has a substantially tubular shape with a light absorbing inner surface 14 and an aperture 20 of fixed dimensions. The fixed dimensions are an image of the specific lens edge 35. The aperture 20 limits the amount of light energy entering the interior of frame 12 from radiant source 30. The other end of the frame 12 has a surface substantially perpendicular to the longitudinal axis 55 of the frame 12 and in alignment with the focal plane 34 of the lens.

Note that the processing element 60 may be implemented in hardware, software, firmware, or any combination thereof. In one embodiment, the processing element 60 is implemented via a digital signal processor (DSP) that executes software in order to provide the functionality of the processing element 60 described herein. However, other configurations of the processing element 60 are possible in other embodiments.

Although lens 30 is depicted in FIG. 1 as a single lens, lens 30 may comprise multiple lenses and/or mirrors in a variety of arrangements that are typically used in a camera or other optical devices. Further, lens 30 may be replaced by a sequence of apertures that focus light energy on detector panel 50. The focal length 32 of the lens 30 as depicted in FIG. 1 is the distance from lens 30's edge 35 to a focal plane 34. The focal length 32 may also be referred to as the effective focal length (efl) of the lens. The lens 30 has a center 31 defined as a point produced by the intersection of the longitudinal axis 55 and a vertical line (the y-direction) that extends upward through the lens 30 as shown in FIG. 1. A detection surface 51 of detection panel 50 is aligned, i.e., it is coplanar, with focal plane 34. The detection surface 51 comprises an array of m by n detectors, such as, for example, a million or more, that may be arranged in a rectangular pattern. Each detector, a pixel, is an independent bitmap of the image of a scene viewed by the camera. The detectors convert the light energy from multiple radiant sources of a scene into electrical signals that are coupled to processing element 60 via the communication link 62. An optical output signal of the processing element 60 is pixel information that may be stored in memory and/or may be available as an input to an optical display device. Light energy received by the detectors comprises both desired light energy that represents the scene or an object and unwanted light energy from within the scene other sources that is referred to as optical noise. Unwanted light energy reduces the quality of an image provided by the camera. The ratio of the desired light energy to the unwanted light energy is expressed as an optical signal-to-noise ratio for the camera, an ensemble of components. The quality of an image provided by the detection panel 50 improves as the signal-to-noise ratio increases.

Figures 2, 3:
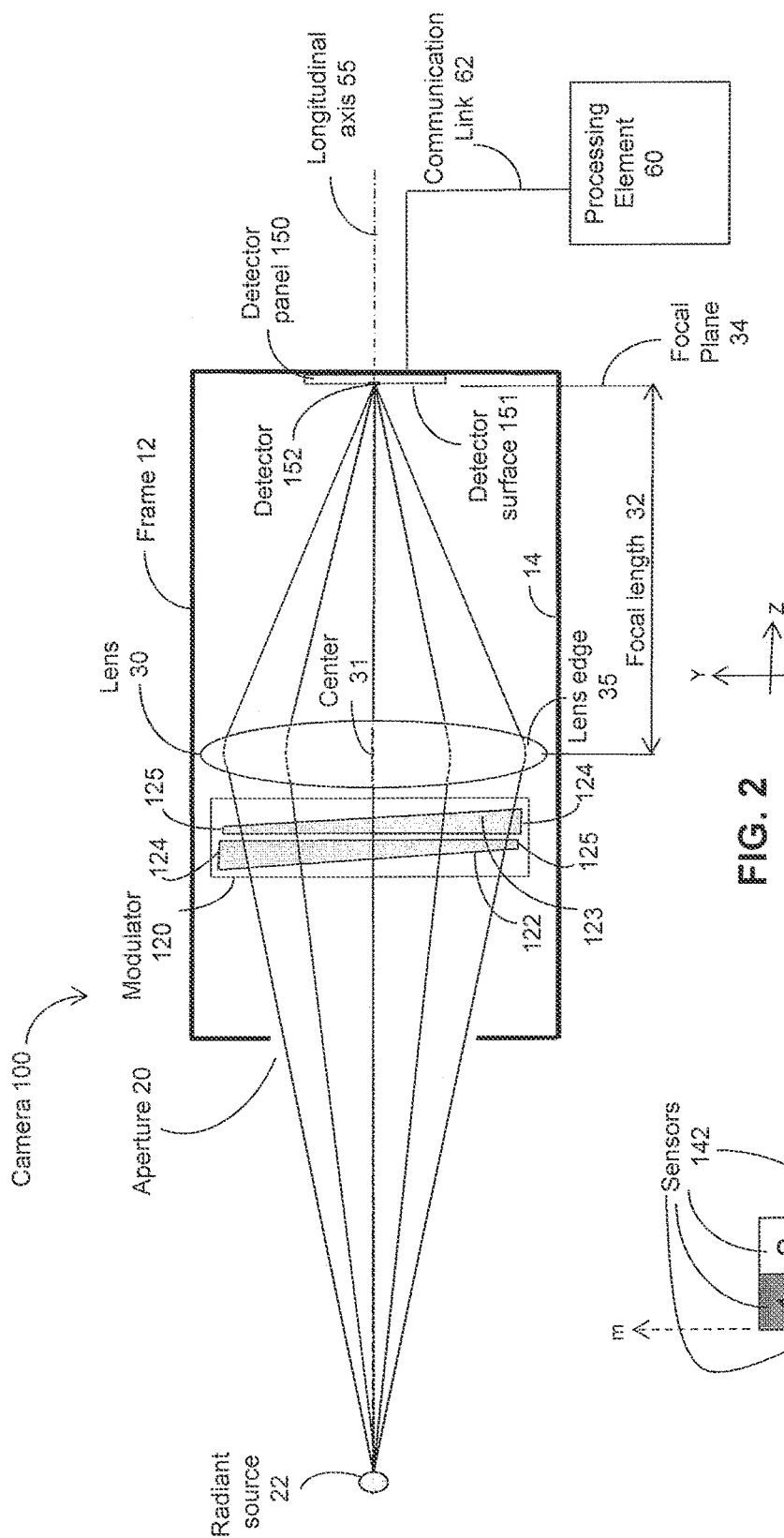
FIG. 2 depicts an embodiment of a camera in accordance with the present disclosure.
FIG. 3 depicts an embodiment of a detector with multiple sensors for the camera of FIG. 2.

FIG. 2 depicts an exemplary embodiment of a camera 100 of the present disclosure. Camera 100 comprises a spatial-phase modulator 120, hereafter referred to as modulator 120 that modulates light energy from the radiant source 22 that enters the camera 100 via aperture 20. Lens 30 receives the modulated light energy and focuses that modulated light energy on detector panel 150. Detector panel 150 has an m by n array of detectors 152 on detector surface 151. Each detector 152 of detector panel 150 comprises multiple sensors 1-4 as shown in FIG. 3, a view seen looking in the z-direction from lens 30 towards the detector surface 151. Modulator 120 is configured to steer a light ray, representing the light energy, to periodically excite sensors 1-4 at a modulation frequency of the modulator 120.

An exemplary embodiment of modulator 120 comprises wedges 122 and 123 positioned as depicted in FIG. 2. The wedges 122-123, made of material having a selected index of refraction, are shown in a side view and generally have a round shape when viewed in the z direction from aperture 20. The wedges 122-123 each have a narrow edge 124 and a wide edge 125. If the wedges 122-123 are positioned as shown in FIG. 2, light energy going in the z-direction passes through the same thickness wedge material. However, if one of wedges 122-123 is rotated about the longitudinal axis 55, for example by 90 degrees, then light energy from radiant source 30 goes through material of various thicknesses resulting in a phase change of the light energy received by a detector 152 of detector panel 150. A modulator with rotating elements, such as modulator 120, is often referred to as a photo-mechanical device. In an exemplary embodiment, wedges 122-123 rotate (the rotational mechanism is not shown) in opposite directions about longitudinal axis 55 causing a continuous variation in the phase of light energy received by the detector panel 150. In one embodiment wedges 122-123 are configured to sequentially excite each sensor 1-4 of detector 152 at a modulation frequency of modulator 120. Each sensor 1-4 of detector 152 is a transducer that converts light energy into electrical energy. The dimensions of the wedges 122-123 and the index of refraction of the wedge material are selected so that a detector centered on an un-modulated light ray does not substantially extended outside the boundaries of the detector 152 as modulation occurs.

Modulator 120 as depicted in FIG. 2 operates similarly to a Risley prism device that is well known to those in field of optics. Such a Risley prism device is used to steer lasers and other light beams upon receiving position information from a device controller having vectoring information. The light energy from radiant source 22 destined for a particular detector 152 is modulated by modulator 120 in such a way that light energy is steered to periodically excite each sensor 1-4 of detector 152.

As indicated above, each detector 152 of the detector panel 150 comprises multiple sensors, for example, four such sensors 1-4 are positioned in a checkerboard arrangement as depicted in FIG. 3. For one exemplary embodiment there are m by n such detectors 152 arranged in a rectangular shape. In other embodiments other numbers of detectors and sensors arranged in different shapes are possible. Each sensor 1-4 of detector 152 provides an electrical signal in response to the modulated light energy that is received by that sensor. The sensors 1-4 communicate their respective electrical signals via communication link 62 to processing element 60. The processing element 60 combines the electrical signals to provide optical information related to the scene viewed by the camera 100. An optical output signal of the processing element 60 is pixel information that may be stored in memory and/or may be available as an input to an optical display device. Because each sensor 1-4 of detector 152 continuously provides an electrical signal, due to modulated light energy, the energy of signals from each detector 152 is greater than the energy from a detector having only one sensor. The signals of greater energy are received by the processing element 60 and provide an improvement in camera sensitivity.

Figures 4, 5:
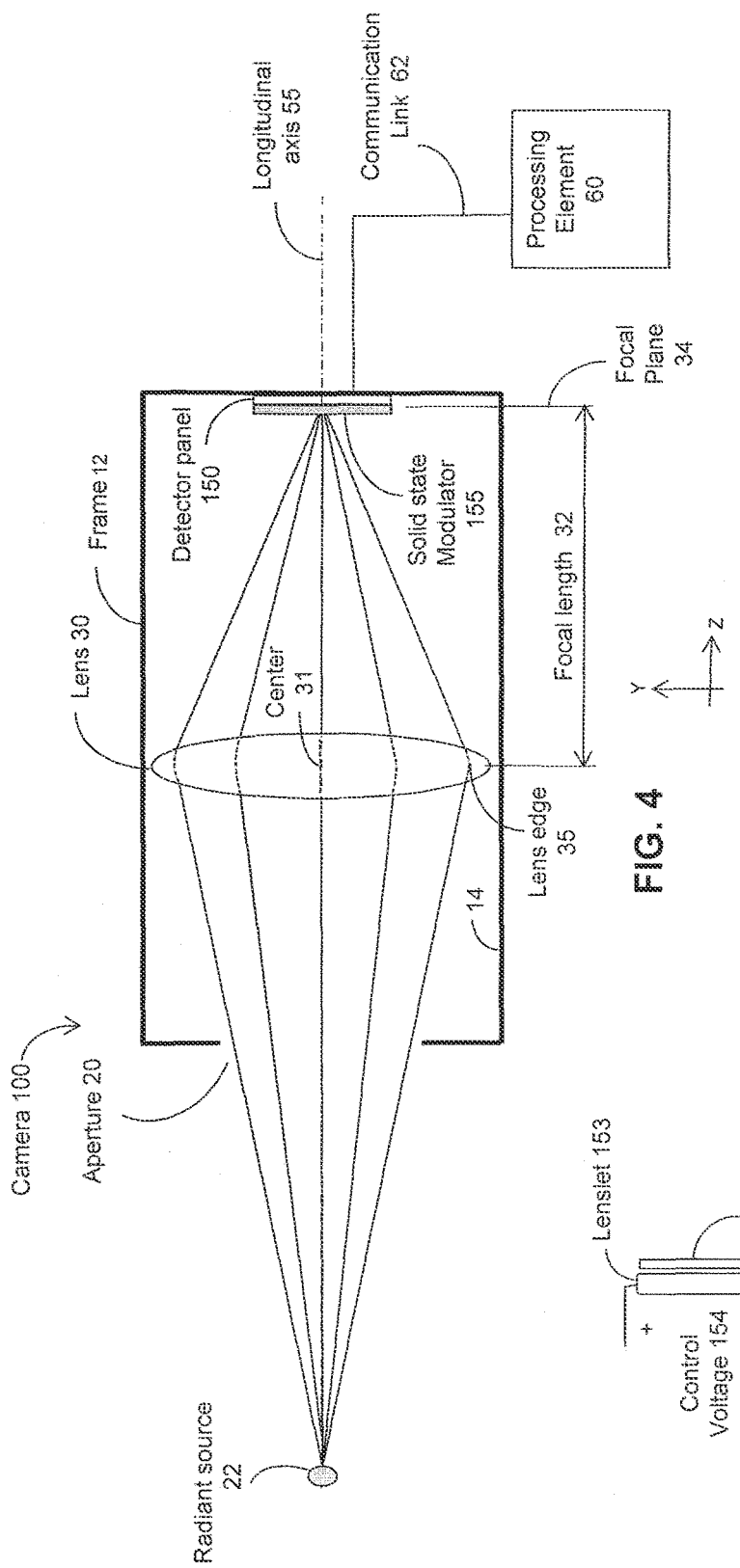
FIG. 4 depicts an embodiment of a camera having a solid-state modulator in accordance with the present disclosure.
FIG. 5 depicts an embodiment of a lenslet of the solid-state modulator for the camera of FIG. 4.

Another embodiment of a modulator for camera 100 that distributes light energy to sensors 1-4 of detector 152 via a modulation action is depicted in FIG. 4. Modulator 155, a solid-state phase modulator, provides modulated light energy to detector 152. An exemplary embodiment of modulator 155 comprises an array of lenslets 153, wherein a lenslet is a small lens. The lenslet 153 is placed next to and in front of a respective detector 152 of the detector panel 150. In such an arrangement, the number of lenslets 153 and number of detectors 152 is substantially equal. In other embodiments, other numbers of lenslets and detectors are possible. For example, one lenslet may be used to modulate light energy for multiple detectors.

In one exemplary embodiment lenslet 153, sometimes referred to as a quantum-mechanical device, is an electro-optic modulator made of materials that change their optical properties, such as their index of refraction, when subjected to an electric field. The electric field for modulating the light energy is provided by a control voltage 154 that is applied to edges of the lenslet 153 as depicted in FIG. 5. The control voltage 154 generally has a magnitude and a phase that causes a light ray to periodically and continuously excite each sensor 1-4 of detector 152. The lenslet 153 is configured to modulate the light energy destined for its respective detector 152 at a modulation frequency consistent with the operation other components of camera 100. Each of the sensors 1-4 of the detector 152 provides an electrical signal in response to the modulated light energy that reaches detector 152. The sensors 1-4 communicate their respective electrical signals via communication link 62 to the processing element 60. The processing element 60 combines the electrical signals to provide optical information that may be viewed as an image and/or stored in memory of the processing element. Because each of the sensors 1-4 of detector 152 provides an electrical signal, periodic signal strength received by the processing element 60 due to such intrinsic light modulation action results in an improvement in camera sensitivity. The processor 60 is configured to processes the electrical signals from the detectors 152 in such a way that both spatial information and as spectral information are available. As with the embodiment of FIG. 2 unwanted light energy received by detector 152 also generates electrical signals that appear as optical noise to processing element 60. It is desirable to limit the amount of unwanted light received by the detectors 152 so as to increase the signal-to-noise ratio of camera 100.

Figure 7:
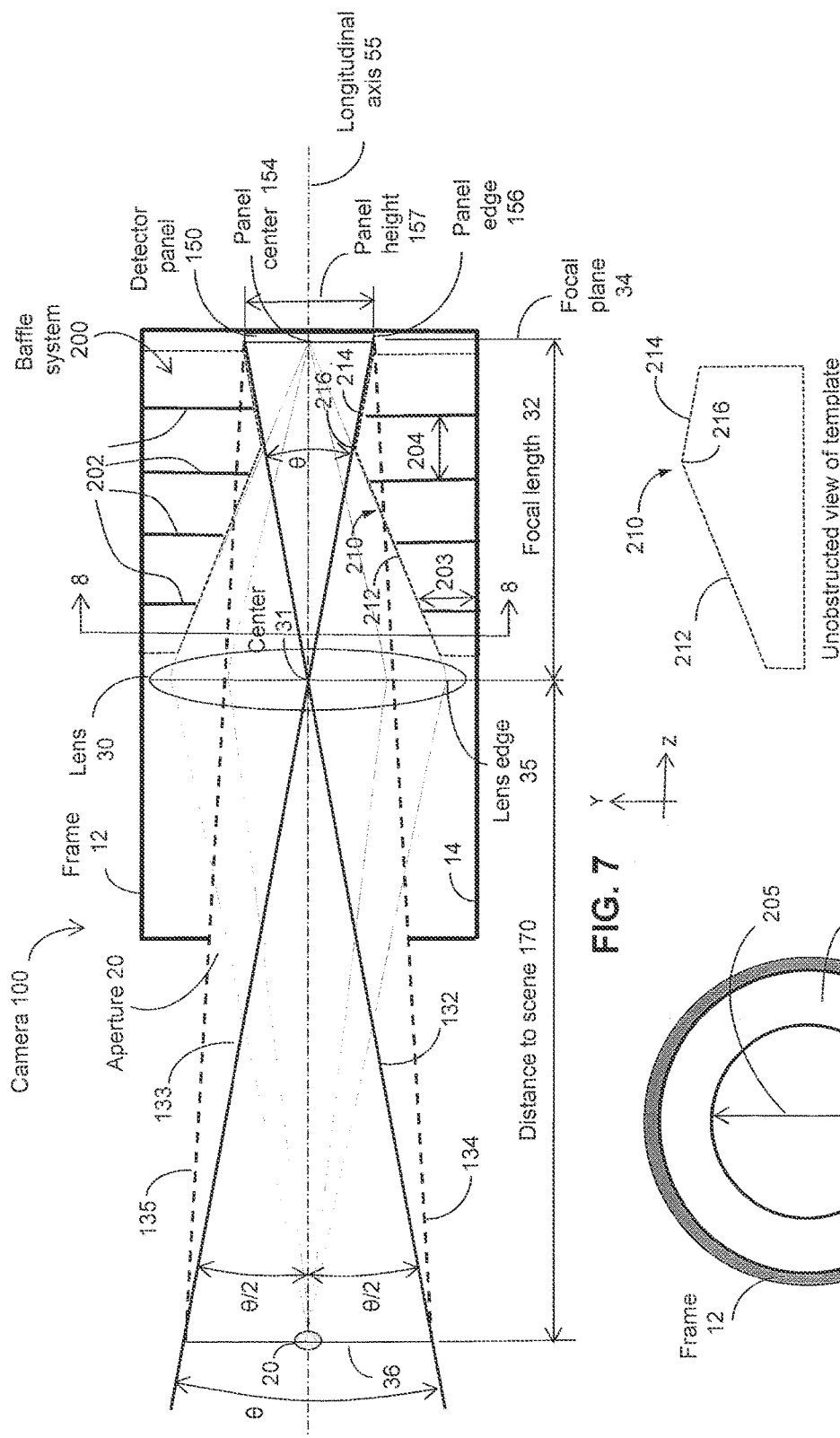
FIG. 7 depicts an embodiment for the baffle system depicted in FIG. 6.

In general, desirable light rays that enter a camera are generally parallel to the longitudinal axis 55 of the camera 100 and fit within a boundary such as defined by lines 134-135 of FIG. 7. Light energy entering aperture 20 from areas outside the boundary is considered undesirable since such light rays are not in the field of view 36 of the scene. When such undesired light energy reaches detector panel 150, the quality of an image of the scene is often degraded. Further, desirable light rays entering the camera from the field of view may bounce from the detector panel and/or from other surfaces within the camera frame and also appear as an additional source of noise. Specific baffles are used to reduce the amount unwanted light received by detectors 152 of detector panel 150. Such baffles form optical shields that block, deflect and attenuate unwanted light that might otherwise strike detectors 152. So when baffles reduce the amount of unwanted light energy reaching detector panel 150 without an equivalent reduction in amount of desired light energy reaching the detector panel 150, then the signal-to-noise ratio of the camera is increased. Although baffles and the interior of the camera frame are coated with black light-absorbing material, it is known that no object, such as a baffle or other optical element is a perfect absorber or a perfect reflector.

Figure 6:
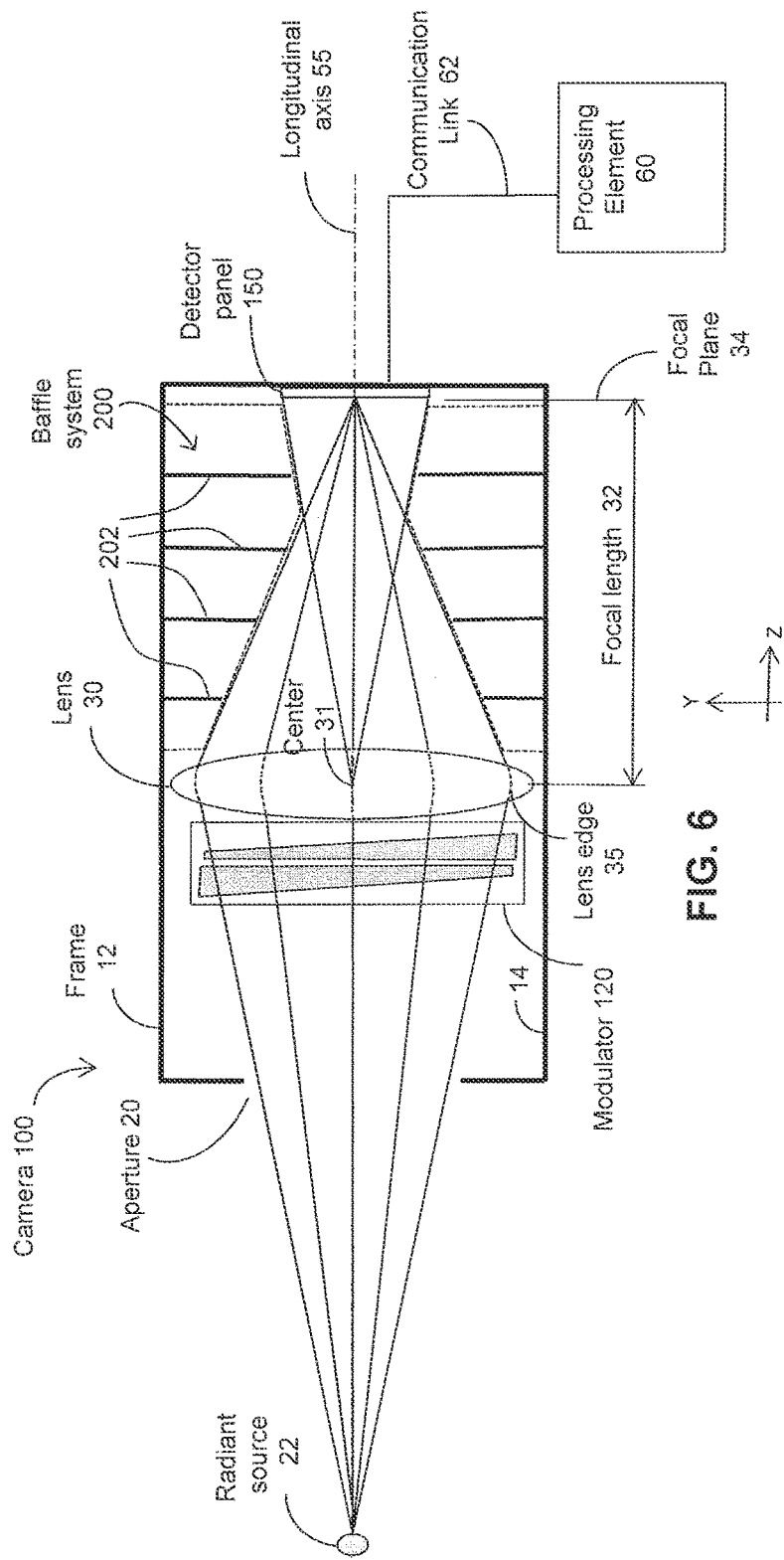
FIG. 6 depicts an embodiment of a camera with a baffle system in accordance with the present disclosure.

An embodiment of a baffle system 200 in accordance with the present disclosure is depicted in FIG. 6. Baffle system 200 comprises one or more baffles 202 located between lens 30 and focal plane 34 of the camera 100. In other embodiments it is possible to have baffles located on both sides of lens 30. When frame 12 has a round tubular shape with a circular inside surface, baffles 202 are generally disk shaped, i.e., round and flat, with an outside diameter such that the outside edges of the baffle 202 fit snugly within the inside surface 14 of the frame 12 and are coupled thereto. The baffles 202 may be coupled to the inside surface 14 of the frame 12 using any attachment techniques known to those in the field of optical devices and instruments. Further, each baffle 202 has an aperture, formed by edges of the baffle 202, centered within the disk shape of the baffle so that desired light energy from the radiant source 22 reaches detector panel 150 with a minimum attenuation. The shape of the aperture of each baffle 202 is round with a selected inside diameter as will be described herein below. The size and shape of the aperture for each baffle 202 may be different in other embodiments. However, for exemplary embodiment of FIG. 7 the baffles 202 of baffle system 200 are configured to substantially reduce the amount of unwanted light that reaches detector panel 150 and appear as noise to the camera 100.

Figure 8:
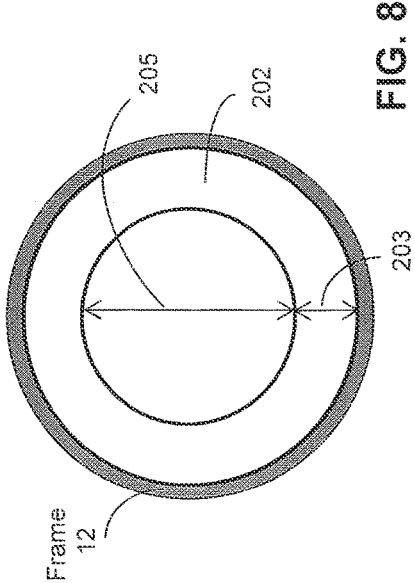
FIG. 8 depicts a cross sectional view of a baffle for the baffle system of FIG. 7.

An exemplary embodiment of baffle system 200 in accordance with the present disclosure is depicted in more detail in FIG. 7, wherein some camera components are removed so as to better show baffle system 200. As depicted in FIG. 7, there are four baffles 202 extending towards the longitudinal axis 55 of the camera 100 from the inner surface 14 of the frame 12. In other embodiments other numbers of baffles are possible. In the embodiment of FIG. 7 the baffles 202 are positioned between the detector panel 150 and the lens 30. The baffles 202 have a disk shape and the surfaces of baffles 202 are coated with light absorbent black material to reduce the amount of light that might otherwise be reflected within the camera frame 12. Each of the baffles 202 has a circular aperture substantially centered about the center of the corresponding disk shape of the respective baffle 202. The diameter 205 of the aperture of baffle 202 is depicted in FIG. 8. As depicted in FIG. 7, the size of each baffle aperture varies, wherein the baffle 202 closest to lens 30 has the largest aperture and the baffle 202 closest to the detection panel 150 has the smallest aperture. The height of the baffle 203, the distance it extends from the inner surface 14 of frame 12 is defined by template 210. When the longitudinal location (the z direction) of a baffle 202 is determined, then the height of baffle 203 is equal to the distance from the inner surface 14 of frame 12 to a boundary defined by lines 212 and 214. Boundary line 212 is a line extending from lens edge 35 to panel center 154. Boundary line 214 is a line extending from the center of the lens 31 to the panel edge 156. As depicted in the FIG. 7 boundary line 212 and boundary line 214 intersect forming point 216. For the baffle system 200 of FIG. 7 the diameter 205 of each aperture of a baffle decreases when going from the lens 30 towards the detector panel 150. An unobstructed view of the template 210 is provided in FIG. 7 to more clearly view the shape of template.

Figure 10:
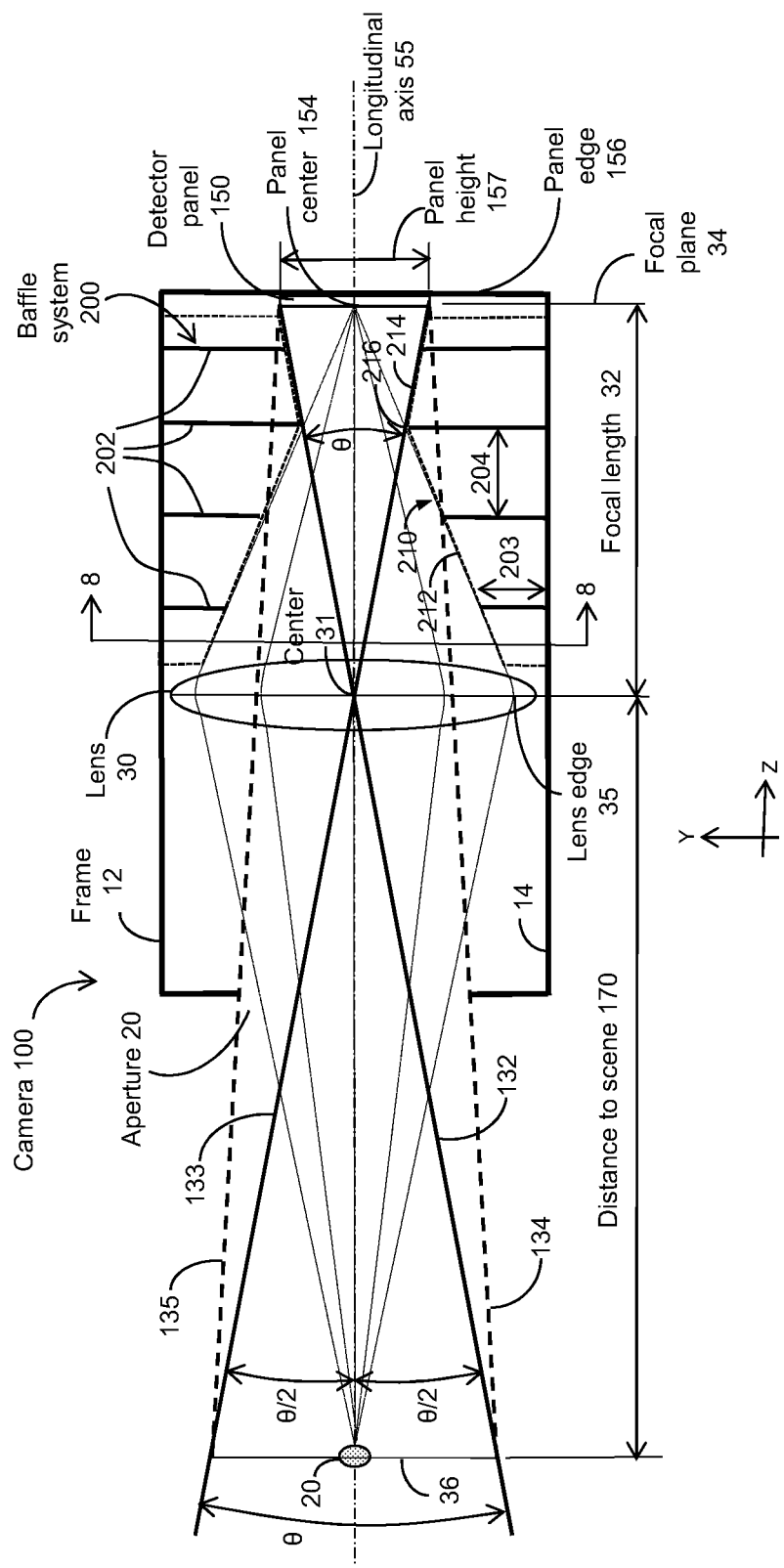
FIG. 10 depicts an embodiment for a baffle system.

A cross section view of baffle 202 is depicted in FIG. 8 as seen looking towards the detector panel 150 from a location between the lens 30 and the baffle nearest the lens. The outside diameter each baffle 202 is selected so that the baffle 202 fits within the inside surface 14 of frame 12 as depicted in FIG. 8. As indicated above, the aperture size of each baffle 202 decreases when moving from the lens 30 towards the detector panel 150. Hence, the diameter 205 of the aperture of the baffle closest to the lens 30 is the relatively largest and the diameter 205 of the aperture of the baffle closest to the detector panel 150 is the relatively smallest. Each diameter or shape is relative to a real or virtual lens edge 35 in FIG. 7. In other embodiments other aperture diameters and other aperture shapes are possible. For example, when a baffle 202 is located at intersection point 216, then that baffle would be the baffle with smallest aperture diameter, as shown by FIG. 10. As would be appreciated by those skilled in the design of cameras, the boundaries of the template 210 of embodiment of baffle system 200 depend on the panel size, the focal length 32 of lens 30, and the lens edge 35 of lens 30. The exemplary embodiment of baffle system 200 of FIG. 7 has four baffles separated by approximately equal distances. In other embodiments other numbers of baffles with other separation distances are possible.

FIG. 7 depicts an embodiment of camera 100 with baffle system 200 for reducing the amount of unwanted light that reaches the detector panel 150. As indicated above, each baffle 202 has a height 203 and the baffles are separated by a baffle spacing 204. In order to better understand camera geometry and the lines 212, 214 that define template 210 and the allowable height of each baffle 202 it is necessary to determine the view angle, θ, of the camera. The view angle, as will be seen below, is dependent of the focal length 32 or effective focal length (efl) of the lens and the panel height 157 of detector panel 150.

Assume that the panel height 157 of the detector panel 150 is known and that the plane of detector panel 150 is co-planar with the focal plane 34. In one embodiment the panel height 157 is equal to the length of a diagonal of a rectangular shaped array of detectors. In other embodiments the panel height 157 may have multiple values depending on the shape of the array of detectors and the angular position about the longitudinal axis 55. The lens 30 is located at a distance from the panel equal to the focal length 32 of lens 30. Extend a line, shown as line 132, from the top edge (located in the y-direction from the center of the detector panel) of detector panel 150 through lens center 31. In addition, extend a line, shown as line 133, from the bottom edge of the detector panel 150 through the lens center 31. The angle between line 132 and line 133 is the view angle, θ, for camera 100. Note that the view angle depends on the focal length 32 of the lens 30 and the panel height 157 of the detector panel 150. When a distance to a scene 170 is known, the radius of a scene area viewed by the camera is approximately equal the tangent of θ/2 times the distance to the scene 170. To determine an area that radiates desired light energy extend a line from the bottom of the field of view 36 through the bottom of the camera aperture 20 shown as line 134. Further, extend a line from the top of the field of view 36 through the top of the camera aperture 20 shown as line 135. Light energy that falls within the area between lines 134-135 represent a scene and is considered a source of desired light. Light energy from below line 134 or above line 135 that passes through camera aperture 20 is considered a source of undesired light energy.

Figure 9:
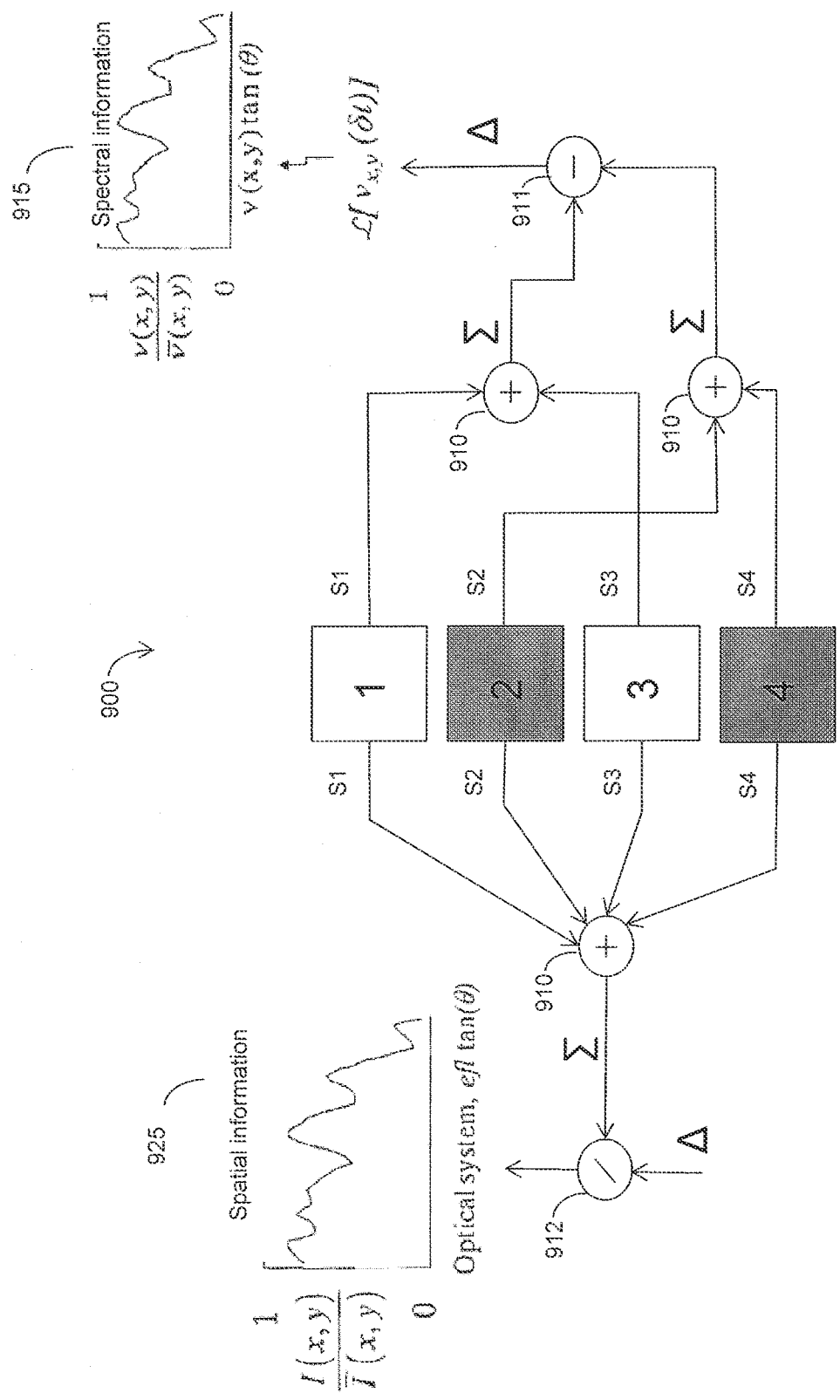
FIG. 9 depicts an exemplary method for processing optical information for the camera of FIG. 6.

An exemplary method embodiment for processing the electrical signals from sensors 1-4 of detectors 152 is depicted in FIG. 9. The electrical signals S1-S4 provided by the respective sensors 1-4 of each detector 152 are processed by the processing element 60. The spectral information 915 of the camera 100, having a panel of m by n detectors, is determined by combining S1-S4 for each of the detectors, via a summer and a subtractor that provides an output, Δ. The output, Δ shown in FIG. 9, is processed using well-known optical processing techniques including the taking the Laplace transform the Δ of each detector 152 of detector panel 150. Spatial information 925 is determined by summing the outputs S1-S4 of each detector of the m by n detectors with a summer and dividing the resulting sum by Δ with a divider. A Hartley transform corrects the Δ sum, an off-set relative to zero the signal. The spatial information 925 and the spectral information 915 may be viewed on an image on optical viewer, such as a digital display device. Operations and actions for method embodiment are provided by logic within processing element 60 of camera 100.

The invention claimed is:

1. A camera comprising:
   a detection panel having an array of detectors with multiple sensors;
   a lens mounted in a frame, the lens positioned to focus light energy from a radiant source on the detection panel, wherein the light energy focused by the lens passes from the lens directly to the detection panel without passing through another lens;
   a modulator configured to modulate the light energy so that the light energy continuously excites each of the sensors;
   a baffle system comprising a plurality of baffles extending inward from the frame, the plurality of baffles including a first baffle with a first height at a first distance from the lens, a second baffle with a second height at a second distance from the lens, and a third baffle with a third height at a third distance from the lens, wherein the second distance is greater than the first distance and the second height is greater than the first height, wherein the third distance is greater than the second distance and the third height is less than the second height, wherein each of the baffles is located between the lens and the detection panel, and wherein the baffles are configured to deflect and attenuate a portion of the light energy; and
   circuitry configured to combine electrical signals from the sensors so as to provide spatial information of the light energy and spectral information of the light energy.

2. The camera of claim 1, wherein the modulator comprises counter rotating prisms.

3. The camera of claim 1, wherein the modulator comprises an electro-optic modulator having optical properties, the electro-optic modulator configured to change the optical properties in response to a control voltage, and wherein the electro-optic modulator is positioned next to the detection panel.

4. The camera of claim 1, wherein the first height and the second height are bounded by a line extending from the edge of the lens to the center of the detection panel.

5. The camera of claim 4, wherein the third height is bounded by a line extending from the center of the lens to an edge of the detection panel.

6. The camera of claim 1, wherein the camera is coupled to an aircraft for capturing images of terrain.

7. The camera of claim 1, wherein the camera is coupled to a satellite for capturing images of terrain.

8. The camera of claim 1, wherein the circuitry comprises a processor.

9. A camera, comprising:
   a lens for receiving light;
   an array of detectors for sensing the light;
   circuitry configured to provide image data defining an image of a scene based on the sensed light, wherein each of the detectors corresponds to a pixel of the image and provides spatial information and spectral information for the corresponding pixel; and
   a baffle system comprising a plurality of baffles including a first baffle with a first height at a first distance from the lens, a second baffle with a second height at a second distance from the lens, and a third baffle with a third height at a third distance from the lens, wherein the second distance is greater than the first distance and the second height is greater than the first height, wherein the third distance is greater than the second distance and the third height is less than the second height, and wherein the baffles are positioned between the array of detectors and a lens surface closest to the array of detectors, and wherein the baffle system is arranged to block a portion of the light passing through the lens from reaching the array of detectors.

10. The camera of claim 9, wherein at least one of the detectors has a plurality of light sensors and a modulator, and wherein the modulator is configured to modulate the light, so the light continuously excites each of the light sensors.

11. The camera of claim 9, wherein the baffles are separated by equal distances.

12. The camera of claim 11, wherein each of the baffles is parallel to the array of detectors.

13. The camera of claim 9, wherein the first baffle has a first aperture through which the light passes, wherein the third baffle has a third aperture through which the light passes, wherein an edge of the first aperture is located at a line that passes through an edge of the lens and a center of the array of detectors, and wherein an edge of the third aperture is located at a line that passes through a center of the lens and an edge of the array of detectors.

14. The camera of claim 10, wherein the circuitry has a first summer for summing first electrical signals from a first plurality of sensors and second electrical signals from a second plurality of sensors for providing spatial information, and a subtractor for subtracting a sum of the first electrical signals from a sum of the second electrical signals for providing spectral information.

15. The camera of claim 9, wherein the circuitry comprises a processor.

16. A camera for a platform-based image capture system for capturing images of terrain, the camera comprising:
 a frame coupled to a platform of the platform-based image capture system;
 a detection panel having an array of detectors with multiple sensors;
 a lens mounted on the frame, the lens positioned to focus light energy from a radiant source on the detection panel, wherein the light energy focused by the lens passes from the lens directly to the detection panel without passing through another lens;
 a modulator configured to modulate the light energy so that the light energy continuously excites each of the sensors;
 a baffle system comprising a first baffle with a first height at a first distance from the lens, a second baffle with a second height at a second distance from the lens, and a third baffle with a third height at a third distance from the lens, wherein the second distance is greater than the first distance, the second height is greater than the first height, the third distance is greater than the second distance, and the third height is less than the second height, and wherein each of the baffles is located between a lens surface closest to the detection panel and the detection panel; and
 circuitry configured to combine electrical signals from the sensors so as to provide spatial information and spectral information of the light energy.

17. The camera of claim 16, wherein the platform is an aircraft.

18. The camera of claim 16, wherein the platform is a satellite.

19. The camera of claim 16, wherein the modulator comprises counter rotating prisms.

20. The camera of claim 16, wherein the modulator comprises an electro-optic modulator having optical properties, the electro-optic modulator configured to change the optical properties in response to a control voltage, and wherein the electro-optic modulator is positioned next to the detection panel.

21. The camera of claim 16, wherein the circuitry comprises a processor.

* * * * *